Jan. 3, 1928.

P. ECKLEY 1,654,641

TRIFOCAL OPTICAL LENS

Filed May 6, 1925

INVENTOR.
PAUL ECKLEY.
BY
ATTORNEYS.

Patented Jan. 3, 1928.

1,654,641

UNITED STATES PATENT OFFICE.

PAUL ECKLEY, OF WALNUT CREEK, CALIFORNIA.

TRIFOCAL OPTICAL LENS.

Application filed May 6, 1925. Serial No. 28,348.

The invention relates to trifocal lenses, and has for its object to provide an improved lens which will correct the vision of the wearer for near, intermediate and distant vision.

The lens is preferably constructed with the distance vision forming the upper and main portion of the lens, the near vision being a smaller circular sector at the lower part of the lens, and the intermediate vision forming part of an annulus outside of the near vision sector.

My tri-focal lens may be made in a variety of manners: For instance, I may use a small lens to form the near vision and a surrounding annulus of glass having a different index of refraction. This large piece of glass would be cut in two on a diameter, each half forming a blank from which lenses would be cut and polished.

My invention will be more readily understood from the following description and drawings in which:—

Figures 1, 2:
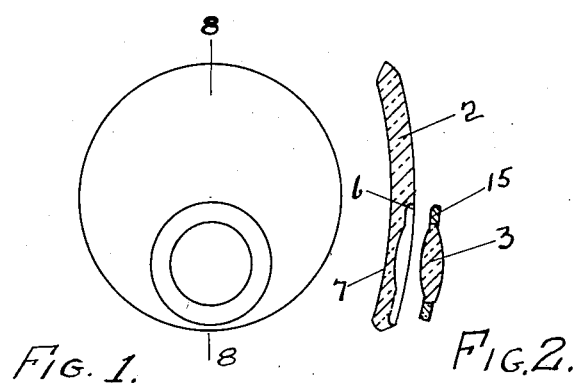
Figure 1 illustrates a plan view of a lens, in which a supporting lens of one type of glass has a central button of another type for the near vision, and a ring of still another type to form the intermediate vision.
Figure 2 is a section of Figure 1 on the line 2—2 indicating the different types of glass separated.

In Figures 1 and 2 three entirely separate glasses, having different indices of refraction are used. The base lens 2, of crown glass, is preferably ground as above described, the central insert 3, of flint glass, is shaped to fit into the portion 7, and an annular ring 15 fits closely to the periphery of the insert 3 and will fuse against the surface 6. This ring 15 has still a different index refraction. In Figure 1 the inserted lens is shown below the center of the main lens and with the intermediate vision portion forming a complete annulus around the reading lens section.

The method and constructive details of forming the tri-focal lens may be considerably modified to suit special requirements and different types of glass being used.

Having described my invention, what I claim is:—

A lens comprising a crown glass base formed with a depression in its forward face, the depression including a central dished section and an offset rim section of independent curvatures, an annular ring seated in said rim section, and a central insert of flint glass seated within said dished section, the indices of refraction of said base, ring and insert being different from each other.

In testimony whereof I affix my signature.

PAUL ECKLEY.